United States Patent [19]

Hagg

[11] 4,013,142
[45] Mar. 22, 1977

[54] ELEVATOR SYSTEM HAVING A DRIVE SHEAVE WITH RIGID BUT CIRCUMFERENTIALLY COMPLIANT CABLE GROOVES

[75] Inventor: Arthur C. Hagg, Pittsburgh, Pa.

[73] Assignee: Westinghouse Electric Corporation, Pittsburgh, Pa.

[22] Filed: Oct. 7, 1975

[21] Appl. No.: 620,442

[52] U.S. Cl. .................. 187/20; 74/230.3; 74/230.5; 242/155 BW; 254/190 R

[51] Int. Cl.² .................. B66B 11/08

[58] Field of Search .............. 187/20–23, 187/1 A; 254/190 R, 191, 192; 74/230.3, 230.5, 230.7, 230.24; 242/155 BW

[56] References Cited

UNITED STATES PATENTS

| 432,701 | 7/1890 | Grimm | 74/230.7 |
|---|---|---|---|
| 3,279,762 | 10/1966 | Bruns | 187/20 |
| 3,838,752 | 10/1974 | Berkovitz | 187/20 |

FOREIGN PATENTS OR APPLICATIONS

| 826,960 | 1/1960 | United Kingdom | 74/230.7 |
|---|---|---|---|
| 517,656 | 2/1940 | United Kingdom | 74/230.7 |
| 518,076 | 2/1940 | United Kingdom | 74/230.7 |

Primary Examiner—Evon C. Blunk
Assistant Examiner—Jeffrey V. Nase
Attorney, Agent, or Firm—D. R. Lackey

[57] ABSTRACT

An elevator system including an elevator car, a counterweight, cables interconnecting the elevator car and counterweight, and a traction drive which includes a drive sheave over which the cables pass. The drive sheave has rigid but circumferentially compliant grooves for the cables. The cable grooves are defined by a plurality of circumferentially spaced sector or segment members. The sector members are connected to the hub portion of the drive sheave with a compliant arrangement which permits a predetermined independent circumferential deflection of each sector member in response to friction forces between the cables and groove surfaces produced by changes in the length of the cables as they pass over the drive sheave.

11 Claims, 10 Drawing Figures

ELEVATOR SYSTEM HAVING A DRIVE SHEAVE WITH RIGID BUT CIRCUMFERENTIALLY COMPLIANT CABLE GROOVES

BACKGROUND OF THE INVENTION

1. Field of the Invention:

The invention relates in general to elevator systems, and more specifically to elevator systems of the traction type.

2. Description of the Prior Art:

In elevator systems of the traction type, the rating of the traction drive machine connected to rotate the drive or traction sheave is determined by the traction efficiency of the arrangement. Traction efficiency is responsive to the ratio of the rope and/or sheave life to the required tractive effort. In other words, the traction drive machine must satisfy the functional requirements of elevator loading and traction within limitations imposed by the wear rates of ropes and sheave to obtain a satisfactory operating life.

In the prior art, geared traction elevator drives usually use a single or half wrap hoist cable and sheave arrangement, and the cable grooves are undercut to wedge or pinch the cables or ropes to increase the tractive effort. This arrangement, however, hastens cable and sheave wear and increases the operating pressure in the groove. To reduce the groove pressure, a larger diameter sheave and/or a larger number of cables or ropes are required. Increasing the diameter of the drive sheave increases the torque arm and requires a drive with a higher rating.

In the prior art, gearless traction elevator drives usually use the double or full wrap hoist cable and sheave arrangement in order to provide the required tractive effort. The grooves are not undercut, but the additional bends in the hoist cables deleteriously affects their life and it increases the loading on the drive sheave, compared with the single wrap. Also, a larger sheave diameter is usually necessary in order to increase the radius of curvature in the rope as it wraps around the drive and secondary sheaves, requiring a drive machine with a higher rating.

The prior art has taken many different approaches in attempting to increase the traction efficiency. For example, U.S. Pat. No. 3,838,752, assigned to the same assignee as the present application, discloses the use of a synthetic lubricant which allows the cables to be adequately lubricated without an offsetting decrease in tractive effort, as the coefficient of friction between the cables and cable grooves provided by the lubricant is high enough to prevent slippage. U.S. Pat. No. 3,279,762 discloses lining the cable grooves of an elevator drive sheave with a pliable or elastomeric element which is "treaded" to provide voids which trap any lubricant which may be exuded from the cables. The elastomeric grooves, while reducing wear, in general have very low allowable contact pressures and the traction capability of the sheave is thus deleteriously affected. U.S. Pat. No. 1,438,674 discloses a mechanical arrangement for forcing the hoist cables of an elevator system tightly into the groove of the drive sheave to increase the traction between the cable and sheave groove. U.S. Pat. No. 432,701 discloses lining the rim of a free running pulley, i.e., not a driven sheave, with alternate blocks of rubber and wood. The wood is grooved to guide a cable and the rubber contacts the cable to reduce slippage of the cable as it passes around the pulley.

It would be desirable to provide a new and improved arrangement for increasing the traction efficiency of a traction elevator system, without compromising the load and traction capability of the drive sheave.

SUMMARY OF THE INVENTION

Briefly, the present invention is a new and improved traction elevator system which improves traction efficiency by substantially reducing the wear of sheave grooves and hoist cables. The drive sheave is constructed to provide cable grooves which are circumferentially compliant to changes in cable length as the cables pass over the drive sheave, while retaining hard or rigid contact surfaces or area at the rope-groove interface. Thus, relative movement or "creep" between the groove surfaces and the cables is reduced and wear is reduced accordingly.

The grooved rim of the drive sheave is subdivided into a plurality of sector members, with each sector being supported by the hub portion of the drive sheave by means which permits the sector member to deflect slightly on a circular curve whose center is the rotational axis of the drive sheave. In a preferred embodiment, the support means for the sector member is a layer of elastomeric material which is bonded to the sector members and to the hub portion. The layer of elastomeric material not only provides the desired circumferential compliance of the sector members, but it also dampens the sector members and reduces vibration when the cables leave them and remove the stress applied thereto. In another embodiment, the sector members are supported from the hub portion by spoke members selected to bend elastically to permit circumferential deflection of the sector members as the cables lengthen or shorten during their path over the drive sheave. In still another embodiment, the sector members are formed of closely spaced metallic laminations or punchings which are clamped to the hub portion of the drive sheave.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
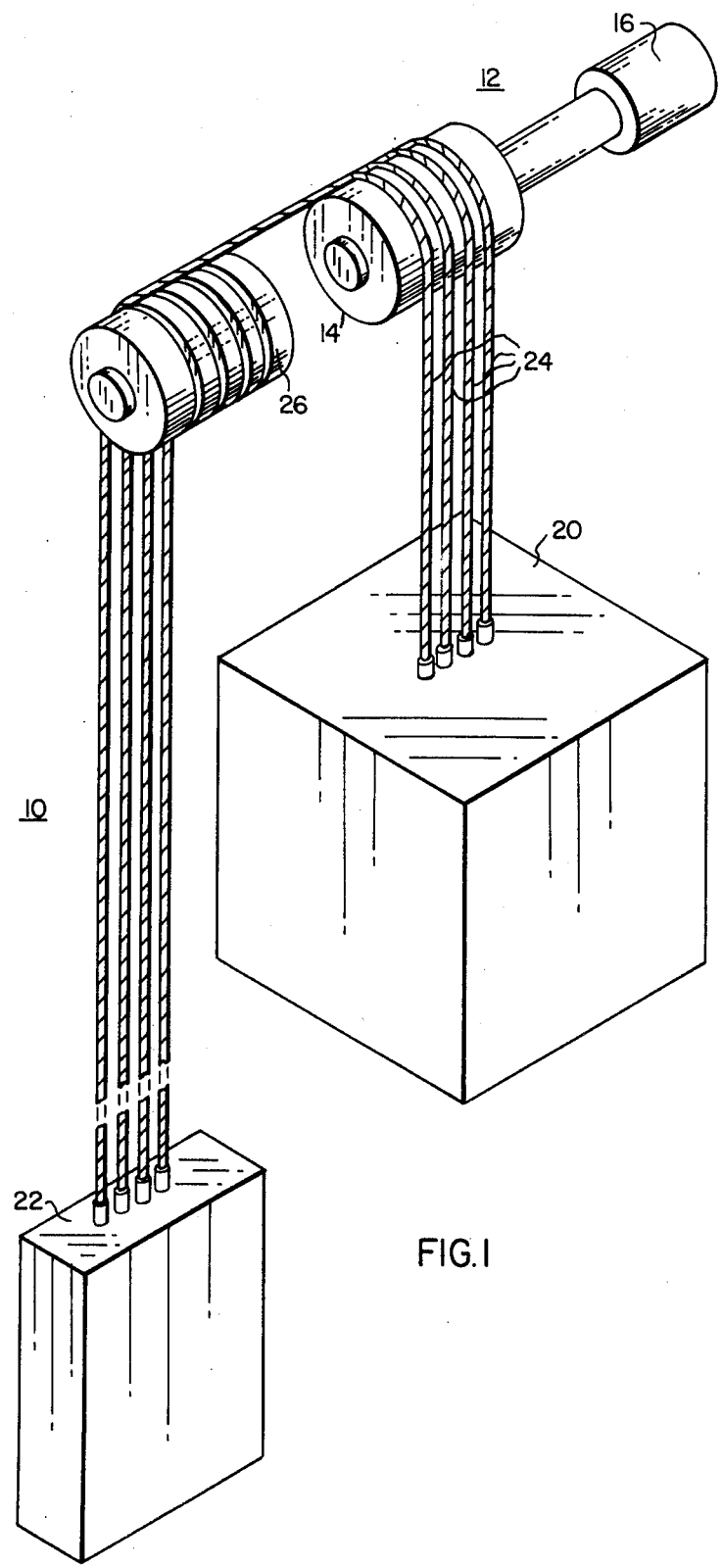
FIG. 1 is a perspective view of a traction elevator system with a single or half wrap hoist roping arrangement, which may utilize the teachings of the invention.

Referring now to the drawings, and FIG. 1 in particular, there is shown a perspective view of an elevator system 10 of the traction type, which may utilize the teachings of the invention. The elevator system 10 includes a traction machine 12, which may be a gearless or a geared machine. The traction machine 12 is generally mounted in the penthouse of a structure having a plurality of floors to be served by the elevator system. Traction machine 12 includes a grooved traction or drive sheave 14, a drive 16 which includes an electric drive motor, a brake assembly, and also a reduction gear, if it is a geared drive.

An elevator car 20 is mounted for movement in the hoistway to serve the floors or landings of the associated building or structure. The elevator car 20 is connected to a counterweight 22 by a plurality of wire ropes or cables 24 which pass around the traction sheave 14. A deflection or secondary sheave 26 may be used when necessary to properly space the elevator car and counterweight. The ropes 24 are thus held in frictional engagement with the cable grooves disposed in the periphery of the drive sheave 14 by the weight of the elevator car 20 and counterweight 22.

In the elevator system 10 shown in FIG. 1, the ropes or cables make a half wrap around the drive sheave 14, which is also commonly called "single wrap". With the half wrap hoist roping arrangement, which is usually used on geared traction drive machines, it is necessary to pinch the ropes in the cable grooves by providing relatively wide undercuts at the bottom thereof. The rope 24 contacts the sides of the groove, with the width of the undercut being typically about ⅜ inch wide for ½ inch rope. The wedging and pinching action of the undercut groove on the cable 24 increases the tractive effort, but is has the disadvantage of hastening cable and sheave wear. It has the further disadvantage of limiting the radial force per inch in the groove, which thus requires a larger diameter sheave and/or a larger number of ropes in order to accommodate a given load. Increasing the traction sheave diameter increases the torque arm and thus a traction machine with a larger rating is required to drive the traction sheave.

Figure 2:
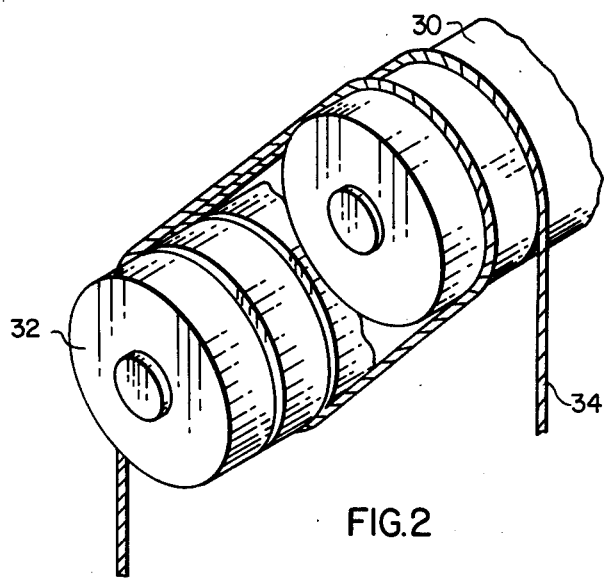
FIG. 2 is a fragmentary, perspective view of a double or full wrap hoist roping arrangement for an elevator system which may utilize the teachings of the invention.

While gearless traction machines may utilize the single wrap hoist roping arrangement shown in FIG. 1, it is more common to develop the necessary tractive effort with a double or full wrap of the hoist ropes, such as illustrated in FIG. 2. FIG. 2 is a fragmentary view of a double wrap hoist roping arrangement, which includes a grooved traction or drive sheave 30, a grooved secondary sheave 32, and a rope 34 which passes around the drive sheave 30 twice. With a double wrap arrangement, the rope groove is contoured to fit the rope, and an undercut is usually not necessary as the double wrap arrangement provides the required tractive effort.

Regardless of the hoist roping-sheave arrangement used, the wear rates of ropes and sheave grooves are proportional to the square of the traction per rope where the traction is defined as the difference between the rope tension forces from one side of the drive sheave to the other. For practical purposes, the wear is proportional to the product of the loading, which is the sum of the tension forces, and the traction. In practice, the number and diameter of the ropes, and the diameter of the drive sheave are selected to achieve a loading and traction per rope which satisfies the functional or capability requirements of the elevator system and the allowable wear rate. For a given capability and life, reduced wear rates permit a smaller diameter sheave, and fewer and/or smaller diameter ropes. A smaller diameter sheave is particularly significant because for a given traction and rope speed a lower torque and high speed motor may be used with an overall reduction in elevator machine size. Smaller and/or fewer ropes are less costly and easier to install.

The operation of a traction elevator requires a tension force change in the wire rope or cable as it passes over the drive sheave. The rope is a compliant element and the change in tension force causes a change in the length of the rope. The mating support by the conventional sheave groove which drives the compliant rope is circumferentially rigid and as a result there is a continuous sliding displacement or creep of the compliant ropes relative to the sheave grooves. This sliding displacement reaches its maximum value at the point where the rope leaves the drive sheave. The magnitude of the sliding displacement, $d$, may be determined by the following formula:

$$d = \frac{T_2 R}{E_1 B \mu} \left( \frac{T_1}{T_2} - 1 - Ln \frac{T_1}{T_2} \right)$$

$T_1$ and $T_2$ are the tensions in the two sides of the rope on opposite sides of the drive sheave, with $T_1$ being greater than $T_2$. R is the radius of the sheave, $E_1$ is the modulus of the rope in force per unit strain, $B\mu$ is the effective coefficient of friction of the rope in the groove, and ln indicates the natural logarithm.

The sliding displacement $d$ under the contact pressure P of the ropes in the sheave grooves is the principal wear mechanism of the ropes and sheave grooves of elevator systems.

The present invention is a new and improved elevator system in which the drive sheave groove surface which contacts the rope may be formed of a conventional sheave material, but the groove support surface is circumferentially compliant and of the proper compliant value with respect to the compliance of the rope such that it deflects and follows the continuous change in length of the rope as it passes over the drive sheave. The rope and its sheave support deflect essentially together and thus sliding displacement and the resulting wear and reduced to low values.

Effective and controllable compliance of the drive sheave which supports the compliant hoist rope is obtained by subdividing the grooved rim of the drive sheave into a plurality of sector members, with each sector member being supported from the sheave hub by means which permits independent circumferential deflection of each sector member as a result of the friction forces at the groove-rope interface.

Figure 3:
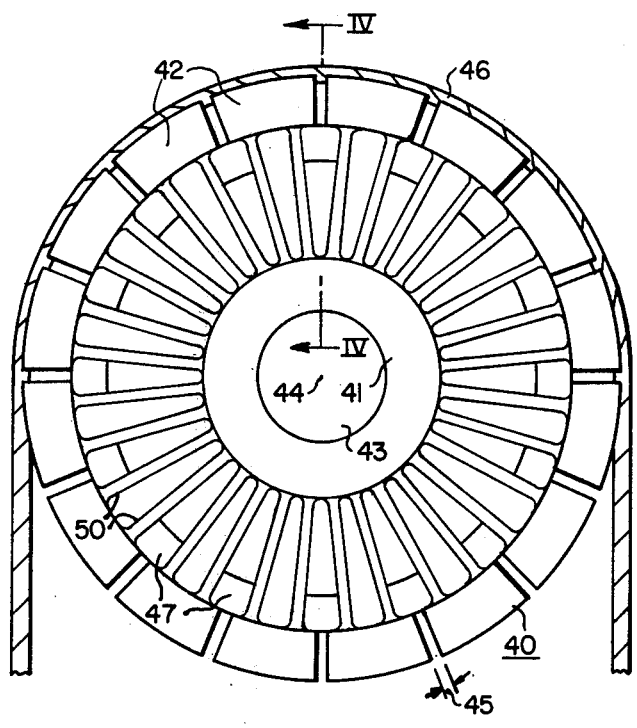
FIG. 3 is an elevational view of a drive sheave constructed according to the teachings of the invention, which may be used in the elevator systems shown in FIGS. 1 and 2.
Figure 4:
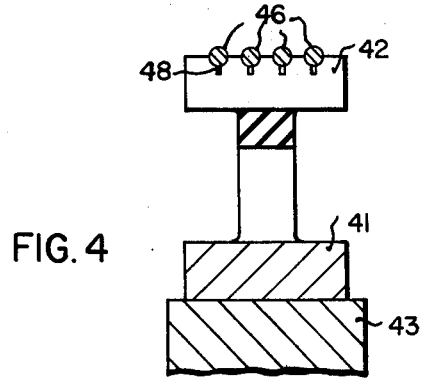
FIG. 4 is a cross-sectional view of the drive sheave shown in FIG. 3, taken between and in the direction of arrows IV—IV.

FIG. 3 is an elevational view of a drive sheave 40 constructed according to a first embodiment of the invention, which sheave may be used for the drive sheaves 14 and 30 shown in FIGS. 1 and 2. FIG. 4 is a cross-sectional view of the drive sheave 40, taken between and in the direction of arrows IV—IV. Drive sheave 40 includes a hub portion 41 which receives a shaft 43 of the elevator drive machine. In this embodiment, the sheave 40 includes a plurality of sector members 42 circumferentially arranged in end-to-end but spaced relation about a circle whose center 44 is the rotational or drive axis of the sheave 40. The spacing between adjacent ends of the sector members 42 is indicated at 45. The outer surfaces of the sector members 42 have a plurality of rope grooves formed therein, best shown in FIG. 4, for receiving hoist ropes 46. The rope grooves may be undercut, as illustrated at 48, in order to increase the tractive effort. The sector members 42 are formed of a rigid, preferably metallic material, such as cast iron.

Each sector member 42 is supported from the hub portion 41 via at least one bending-compliant spoke member 50, with the number of spoke members 50 per sector member being determined by the number of sector members utilized. The spoke members 50 should be formed of a material such as steel, which will bend elastically and allow their associated sector members to move under the influence of changes in the length of the associated ropes or cables. The spoke members 50 may be formed integrally with the sector members, such as by casting; or they may be discrete members which are welded or otherwise suitably attached to the hub portion 41 and to their associated sector members 42. The sector members may be conveniently fabricated by first forming a continuous grooved rim, and then cutting the rim to form the sectors, before or after the spokes are attached to the rim.

Figure 5:
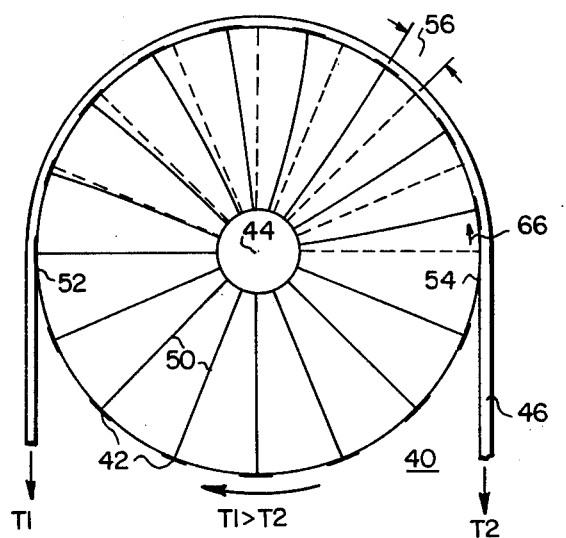
FIGS. 5 and 6 are diagrammatic views of the drive sheave which are explanatory of the circumferential compliance of the cable grooves which occurs as a cable passes over the drive sheave shown in FIGS. 3 and 4.
Figure 6:
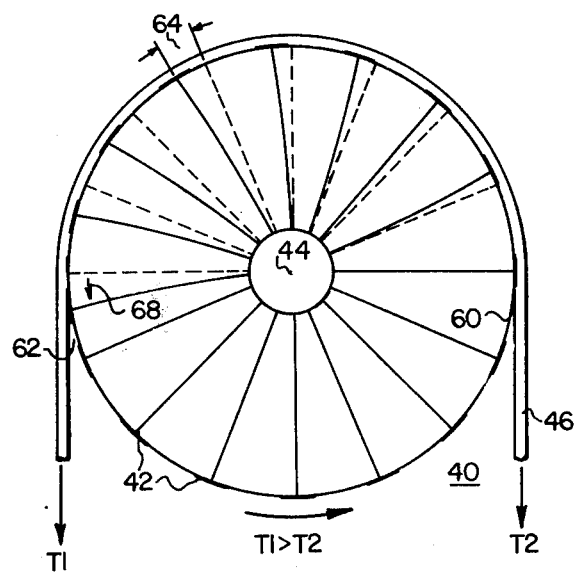

FIGS. 5 and 6 are diagrammatic representations of sheave 40, illustrating in an exaggerated manner the deflection of the sector members 42 along a circular arc about the center 44 of the sheave 40. FIG. 5 illustrates the case for clockwise rotation of the sheave 40 with the tension force $T_1$ in the cable on one side of the sheave exceeding the tension force $T_2$ in the rope on the other side of the sheave. Thus, the cable 46 must continuously shorten its length from the point of entry 52 to the exit point 54 and the deflection 56 of the sectors thus increases gradually from the point of entry 52 to a maximum deflection at the point 54 where the rope 46 leaves the sheave 40. The unstressed positions of the spokes 50 are indicated with a broken line. The maximum deflection of the sector members and rope are in the range of 0.001 inch to 0.010 inch (0.025 − 0.25 mm), and thus the relative deflections of adjacent sectors is small and the spacing 45 between the ends of adjacent sectors may thus be a very small dimension.

FIG. 6 illustrates the case for counterclockwise rotation of the sheave 40, with the tension force $T_1$ again exceeding the tension force $T_2$. The cable 46 must continuously lengthen from the point of entry 60 to the exit point 62, and the deflection 64 of the sector members 42 thus increases gradually from the point of entry 60 to a maximum deflection at the point 62 where the rope 46 leaves the sheave 40. In both examples, the sum of the friction forces acting on the several sectors is equal to the difference in rope tension forces $T_1 - T_2$.

The deflections of the sectors caused by friction forces at the rope-sector interface match on the average the relative rope displacements corresponding to the shortening, or lengthening, of the rope from the entry to the exit point on the sheave. Also, in both examples, the deflection of the sectors increases gradually from the point of entry to a maximum value at the point where the rope leaves the sheave, with the deflections being toward the larger tension force in the rope. In FIG. 5, the rope enters the left side of the sheave 40, the maximum deflection is on the right side, and the direction of the deflection, indicated by arrow 66, is towards the larger tension $T_1$. In FIG. 6, the rope enters the right side of the sheave 40, the maximum deflection is on the left side, and the direction of the deflection, indicated by arrow 68, is towards the larger tension $T_1$.

In order for the sheave 40 to operate effectively in reducing relative motion between the metallic interface between the ropes and groove surfaces, it is essential that the compliance of the sheave sectors have a value within a predetermined range, with the preferred value of the compliance C being about:

$$C = dn/3(T_1 - T_2)$$

In this formula, $d$ is the maximum sliding (creep) deflection as calculated for a conventional sheave according to the hereinbefore listed formula for the calculation of the deflection $d$. The letter n represents the number of sector members 42 which are engaged by the rope (i.e., one-half of the total number of sectors for a 180° wrap of the rope about the drive sheave). $T_1$ and $T_2$ are the rope tension forces, with $T_1$ exceeding $T_2$. For example, if $d$ was calculated to be 0.0045 inch (0.114 mm), the number of sectors contacting the rope is 8, and $T_1 - T_2$ is 3,000 pounds, the compliance C would be $4 \times 10^{-6}$ inch per pound ($1 \times 10^{-4}$ mm per pound). Thus, a sector and the means for mounting the sector to the hub portion should be designed such that the application of a circumferential friction force of one pound at the rope-groove interface will cause a circumferential deflection of the sector of 4 microinches. In practice, the compliance of the sectors may vary from the preferred value, such as in the range of:

$$C = \frac{dn}{(T_1 - T_2)} \text{ to } C = \frac{dn}{10(T_1 - T_2)}$$

If the number of sector members is increased, the compliance of each sector member may be increased proportionately, as indicated in the formula by C being directly proportional to the number of sectors in contact with the ropes. The accommodation by the compliant sheave of the invention to a change in rope length and the corresponding reduction in sliding wear is roughly proportional to the number of sectors which are utilized. With six sectors in contact with the ropes, the wear is reduced to about ¼ that of a conventional sheave. With 12 sectors in contact with the ropes, the wear is reduced to about 1/10 that of a conventional sheave. Practical benefits are obtained with as few as four sectors in contact with the rope, i.e., a total of eight sectors for the sheave for a wrap angle of 180°. As a practical matter, the sectors are of approximately equal arc lengths; however, the wear reducing benefits of a compliant sheave can be retained with combinations of unequal arc lengths of the sectors and the invention encompasses such design variations in arc length of sectors that may be advantageous in noise control, manufacture or for any other reason.

In the operation of a compliant sheave, as a deflected sector leaves contact with the rope and is unloaded, the sector will tend to vibrate unless damped. To avoid unwanted free motions of the sectors, damping forces may be provided by suitable means. For example, as illustrated in FIGS. 3 and 4, blocks 47 of elastomeric material compounded for internal damping may be disposed between the spoke members 50 of adjacent sector members 42.

Figure 8:
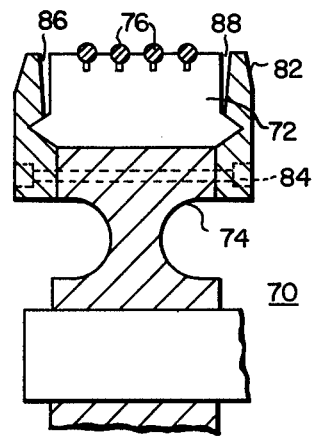
FIG. 8 is a cross-sectional view of the drive sheave shown in FIG. 7, taken between and in the direction of arrows VIII—VIII.
Figure 7:
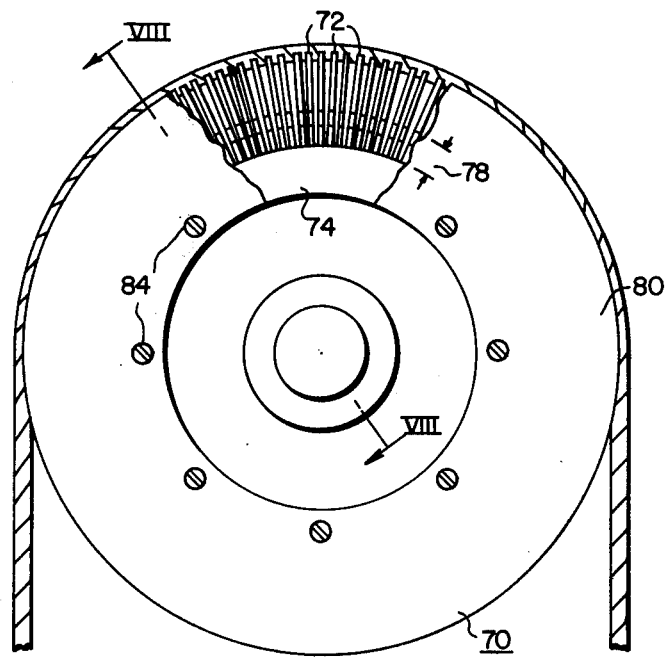
FIG. 7 is an elevational view of a drive sheave constructed according to another embodiment of the invention.

FIG. 7 illustrates a drive sheave 70 having a large plurality of sectors 72, each of which is a simple radial beam element, such as a metallic lamination or punching. The sectors 72 are assembled about the hub portion 74 of the drive sheave in commutator-like fashion with a small clearance between the outer ends of the elements, such as 0.001 inch (0.025 mm), to accommodate relative deflection. The outermost ends of the sectors 72 are notched, as best shown in FIG. 8, which is a cross-sectional view of sheave 70 taken between and in the direction of arrows VIII—VIII, with hoist ropes 76 being disposed about the sheave in the notches. The notches collectively define the rope grooves. The sectors 72 are held in assembled relation and clamped towards their inner ends, with the clamped area being indicated by reference 78. The clamping means may be first and second washer-shaped members 80 and 82 which are attached to opposite ends of the hub portion 74 by fastening means, such as bolts 84. The first and second washer members 80 and 82 contact the edges of the sector members 72 in the area indicated by the reference numeral 78, and then the washer members angle outwardly away from the edges of the sectors to provide spaces 86 and 88, which spaces allow the sector members to deflect in response to friction forces at the rope-sector interface resulting from the length change in the ropes 76. In the FIG. 7 embodiment, the sectors and spoke members are integral, i.e., the outer edges of the spoke members are closely spaced to provide a substantially continuous rope groove for supporting the ropes 76, without attaching separate sector members to the spokes.

Figure 9:
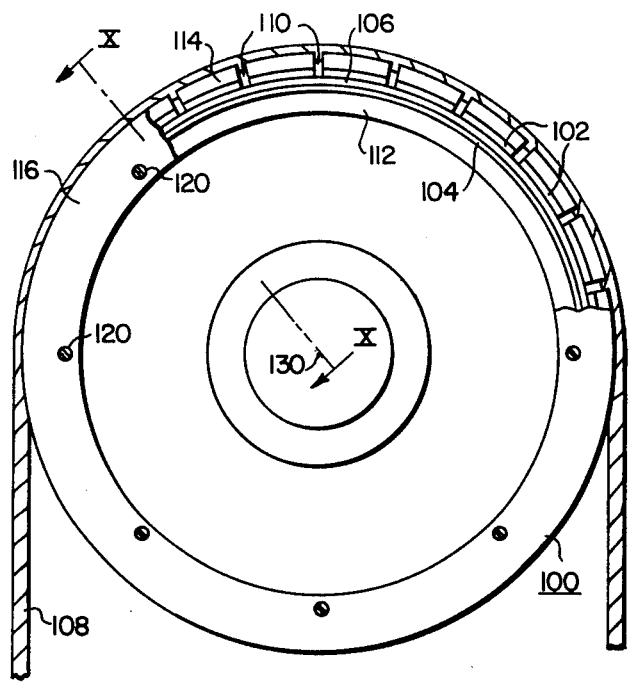
FIG. 9 is an elevational view of a drive sheave constructed according to still another embodiment of the invention.

FIG. 9 is an elevational view of a sheave 100 constructed according to a preferred embodiment of the invention wherein the means for attaching the sector members to the hub is an elastomeric material bonded to the hub and to the plurality of sector members. A plurality of grooved sector members 102 are bonded to the smooth outer surface of a hub portion 104 by an annulus layer 106 of shear-compliant material such as neoprene, rubber, polyurethane, or other suitable elastomer. This embodiment is favorable with respect to damping because the rubber-like material of the compliant layer may also include an appropriate damping characteristic. For example, polyurethane materials may be compounded for a wide range of compliant and damping properties.

Figure 10:
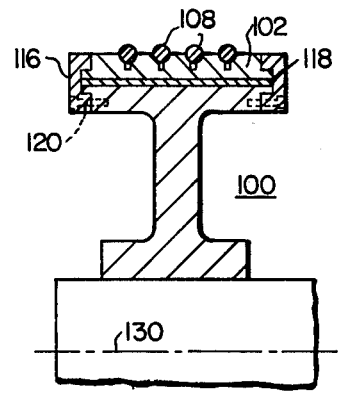
FIG. 10 is a cross-sectional view of the drive sheave shown in FIG. 9, taken between and in the direction of arrows X—X.

FIG. 10 is a cross-sectional view of the sheave 100, illustrating the grooved sectors and a plurality of ropes 108 disposed in the grooves. The ropes 108 link the sectors 102 with a series compliance. Additional series compliance between the sectors 102 provides design latitude and may be obtained, for example by filling the gaps 110 between the ends of adjacent sectors with a suitable elastomeric material, such as the same material used for the layer 106. Filling in the space between adjacent ends of the sectors with a resilient or elastomeric material also avoids the possibility of foreign material accumulating in the gaps and interfering with the proper deflection of the sectors.

The plurality of sectors 102 are allowed circumferential movement to accommodate the length change in the rope 108, but the sector members are mechanically secured to the hub portion 104 to insure that the sectors will remain in the proper assembled relation with the hub portion in the event the adhesive bond provided by the layer 106 of elastomeric material should fail. The opposite faces of the hub portion 104 may be undercut, such as indicated at 112, and opposite sides of the segments 102 may be provided with a recess 114. First and second washer-shaped members 116 and 118, which have a substantially U-shaped cross-sectional configuration, best shown in FIG. 10, are fastened to opposite sides of the hub, such as by bolts 120. The legs of the U-shaped configuration enter the undercut 112 in the hub and they enter the recess 114 of the segment members, to provide a mechanical stop beyond which the segments are not free to move. A slight clearance is provided between the washer-shaped members 116 and 118 and the plurality of segments in order to allow the segments to move circumferentially as required by the friction forces in the rope-segment interface to adjust for rope length changes with reduced relative movement between the ropes and the rope grooves.

Very low allowable contact pressures for elastomeric materials make it impractical to provide a compliant sheave by lining the rope grooves with elastomeric material, as the load and traction capability of the sheave would be seriously compromised. The sheave of the present invention enables the same metallic sheave material to be used for the rope grooves, such as cast iron, or any other suitable rigid materials may be used for the rope groove surfaces. In the use of the elastomeric material as a compliant layer between the sectors and the hub of the drive sheave, the support area is relatively large, enabling relatively soft materials, such as polyurethane, to be used as the compliant layer, as the contact pressure will typically be in the range of 50–100 psi.

The compliance of the sectors depends upon (a) the thickness of the elastomeric layer, (b) the shear area, and (c) the hardness of the elastomer. Increasing the thickness increases the compliance, while reducing the thickness reduces the compliance. Increasing the shear area, i.e. the surface area of the sector which contacts the elastomeric layer, decreases compliance, while decreasing the shear area increases compliance. Increasing the hardness decreases compliance, while decreasing the hardness increases compliance.

The thickness of the elastomeric layer thus may be selected to accommodate a given shear area, or vice versa. Also, the hardness of a selected elastomer may be accommodated by proper selection of layer thickness and shear area, etc.

The thickness of the elastomeric layer will typically be in the range of about 0.0625 inch to 0.1875 inch (1.59 – 4.75 mm). The unit compliance is typically 10% per 100 psi. Shear stress, i.e. the shear deflection divided by the thickness of the layer is 0.1 per 100 psi shear stress. The hardness of the elastomeric layer will typically be in the range of 75–85 durometer A (Shore test).

The sheave 100 may be easily fabricated and assembled by placing the sheave hub portion 112 in a suitable mold with the rotational axis 130 of the hub portion being disposed vertically. The segment members 102 may then be placed in the mold and properly spaced from the hub portion 112 by pins or other suitable spacing means. The elastomer, in liquid form, may then be introduced into the spaces between the sector members and hub. At a suitable point in the process of solidifying and curing the elastomer, the spacer pins may be removed, and the elastomeric material cured to a tough resilient solid which tenaciously bonds the sector members to the hub. If the spaces 110 are to be filled with an elastomeric material, they may be filled at the same time that the layer 106 of elastomeric material is introduced. Otherwise, the spaces 110 may be filled with inserts which are removed after the elastomer solidifies.

Another equally suitable arrangement for fabricating sheave 100 would be to provide a continuous grooved rim, bond the continuous rim to the hub portion, and then cut the rim to form the sectors. This greatly simplifies the mold and the correct placement of the sheave elements in the mold.

In summary, there has been disclosed a new and improved traction elevator system in which the wear of rope grooves in the drive sheave, as well as the rope wear is substantially reduced. Reducing the wear rate of these components of a traction elevator system increases the traction efficiency of the system. Increasing the traction efficiency by reducing groove and rope wear enables higher loads per rope to be applied to any given sheave and thus the size and/or number of ropes may be reduced and/or the drive sheave diameter may be reduced. Reducing the diameter of the drive sheave reduces the torque arm and a smaller elevator drive machine may be used. When relative movement between the rope and the grooves is reduced, the undercut in the grooves does not cause the wear rate that it normally would, and the single wrap with undercut grooves may be extended to higher speed elevator systems, into the gearless speed range, replacing the double or full wrap arrangement which would otherwise be used in order to obtain the tractive effort required at higher speeds without offsetting wear of the grooves and sheave.

I claim as my invention:

1. An elevator system, comprising:
   an elevator car,
   a counterweight,
   a drive sheave including a hub portion rotatable about a drive axis, a plurality of metallic sector members, and means mounting said plurality of sector members on said hub portion in circumferentially spaced relation, said plurality of circumferentially spaced sector members defining at least one metallic cable groove about the drive axis,
   means for driving said drive sheave about the drive axis,
   and a cable interconnecting said elevator car and said counterweight while disposed about said drive sheave in the at least one cable groove,
   said means which mounts the plurality of sector members on the hub portion of said drive sheave being selected to provide a circumferential compliance per sector member in a preferred range between a first value equal to the product of the maximum sliding displacement of the cable and the number of sector members in contact with the cable divided by the difference in the tension forces in the cable on opposite sides of the drive sheave, and a second value equal to about 1/10th of said first value, allowing predetermined circumferential deflection of each sector member responsive to changes in the length of the cable as it passes over the drive sheave.

2. The elevator system of claim 1 wherein the plurality of sector members include a plurality of radial beam elements assembled about the hub with their inner ends fixed and their outer ends in predetermined spaced relation, enabling the outer ends of the radial beam elements to deflect about the fixed inner ends and accommodate changes in cable length without relative movement between the cable and radial beam elements.

3. The elevator system of claim 2 wherein the radial beam elements are flat, metallic sheet members disposed such that their major opposed surfaces are in planes which intersect one another substantially at the drive axis of the drive sheave.

4. The elevator system of claim 1 wherein the circumferentially spaced sector members define a plurality of grooves, and including a plurality of cables connecting the elevator car and counterweight while disposed about the drive sheave in the plurality of cable grooves.

5. The elevator system of claim 1 wherein there are at least four sector members in contact with the cable.

6. The elevator system of claim 1 wherein the means mounting the plurality of sector members on the hub portion of the drive sheave includes an annular layer of shear compliant material.

7. The elevator system of claim 6 wherein the shear compliant material is an elastomer.

8. The elevator system of claim 1 including resilient means disposed between adjacent circumferentially spaced ends of the sector members.

9. An elevator system, comprising:
   an elevator car,
   a counterweight,
   a drive sheave including a hub portion rotatable about a drive axis, a plurality of sector members, and means mounting said plurality of sector members on said hub portion in circumferentially spaced relation, said plurality of circumferentially spaced sector members defining at least one cable groove about the drive axis,
   means for driving said drive sheave about the drive axis,
   and a cable interconnecting said elevator car and said counterweight while disposed about said drive sheave in the at least one cable groove,
   said means mounting the plurality of sector members on the hub portion of said drive sheave allowing predetermined circumferential deflection of each sector member responsive to changes in the length of the cable as it passes over the drive sheave, said means mounting the plurality of sector members on the hub portion of the drive sheave including at least one spoke member disposed to interconnect each sector member with the hub portion, with said spoke member being deflectable responsive to forces in the cable which change the length thereof as it passes over the drive sheave, to permit predetermined movement of the sector members along a circular arc.

10. The elevator system of claim 9 including damping means disposed to dampen vibrations in the sector members when the cable leaves a deflected sector member.

11. An elevator system, comprising:
an elevator car,
a counterweight,
drive means including a drive sheave having a periphery rotatable about a drive axis,
cable groove means on the periphery of said sheave which defines at least one cable groove,
and a cable interconnecting said elevator car and said counterweight while disposed about said drive sheave in said at least one cable groove,
said cable groove means being cicumferentially compliant to the cable in response to tension therein, with said cable groove means including a plurality of circumferentially spaced sector members and elastomeric means resiliently attaching the sector members to the drive sheave,
said sector members each being formed of a material which is more rigid than said elastomeric means, with the material being selected to accommodate the pressure of the cable in the cable groove without apparent deflection,
said elastomeric means being selected to provide a circumferential compliance per sector member in a range between a first value equal to the product of the maximum sliding displacement of the cable and the number of sector members in contact with the cable divided by the difference in tension forces in the cable on opposite sides of the drive sheave, and a second value equal to about 1/10th of said first value, enabling friction forces at the cable-cable groove interface due to a change in cable length from the cable entry point to the cable exit point on the drive sheave to cause predetermined circumferential movement of certain of the sector members about the rotational axis of the drive sheave, reducing relative movement between the cable and its associated cable groove means.

* * * * *